United States Patent [19]

Janosco

[11] Patent Number: 5,125,825
[45] Date of Patent: Jun. 30, 1992

[54] PLASTIC PIPE BENDER

[76] Inventor: Michael J. Janosco, 9443 Doral Dr., Pittsburgh, Pa. 15237

[21] Appl. No.: 673,188

[22] Filed: Mar. 21, 1991

[51] Int. Cl.⁵ .................... B21D 7/00; B29C 53/00
[52] U.S. Cl. ..................... 425/392; 72/386; 249/53 R
[58] Field of Search ............ 72/369, 380, 386; 249/53 R; 425/392, 393

[56] References Cited

U.S. PATENT DOCUMENTS

| | | | |
|---|---|---|---|
| 3,000,424 | 9/1961 | Weise | 72/369 |
| 3,776,539 | 12/1973 | Curtis et al. | 425/392 |
| 4,015,918 | 4/1977 | McPhee et al. | 425/392 |
| 4,156,588 | 5/1979 | Miller et al. | 425/392 |
| 4,747,768 | 5/1988 | Crupi | 425/392 |

Primary Examiner—Jay H. Woo
Assistant Examiner—Scott Bushey

[57] ABSTRACT

A plastic pipe bending jig is provided with two offset bending members to fabricate an offset bent pipe. Each bending member is provided with first and second support surfaces, wherein the first support surfaces of each bending member are linearly aligned with each other and the second support surface of each bending member are parallel but offset from each other. The position of the bending members is adjustable so that the pipe offset can be changed as desired.

13 Claims, 2 Drawing Sheets

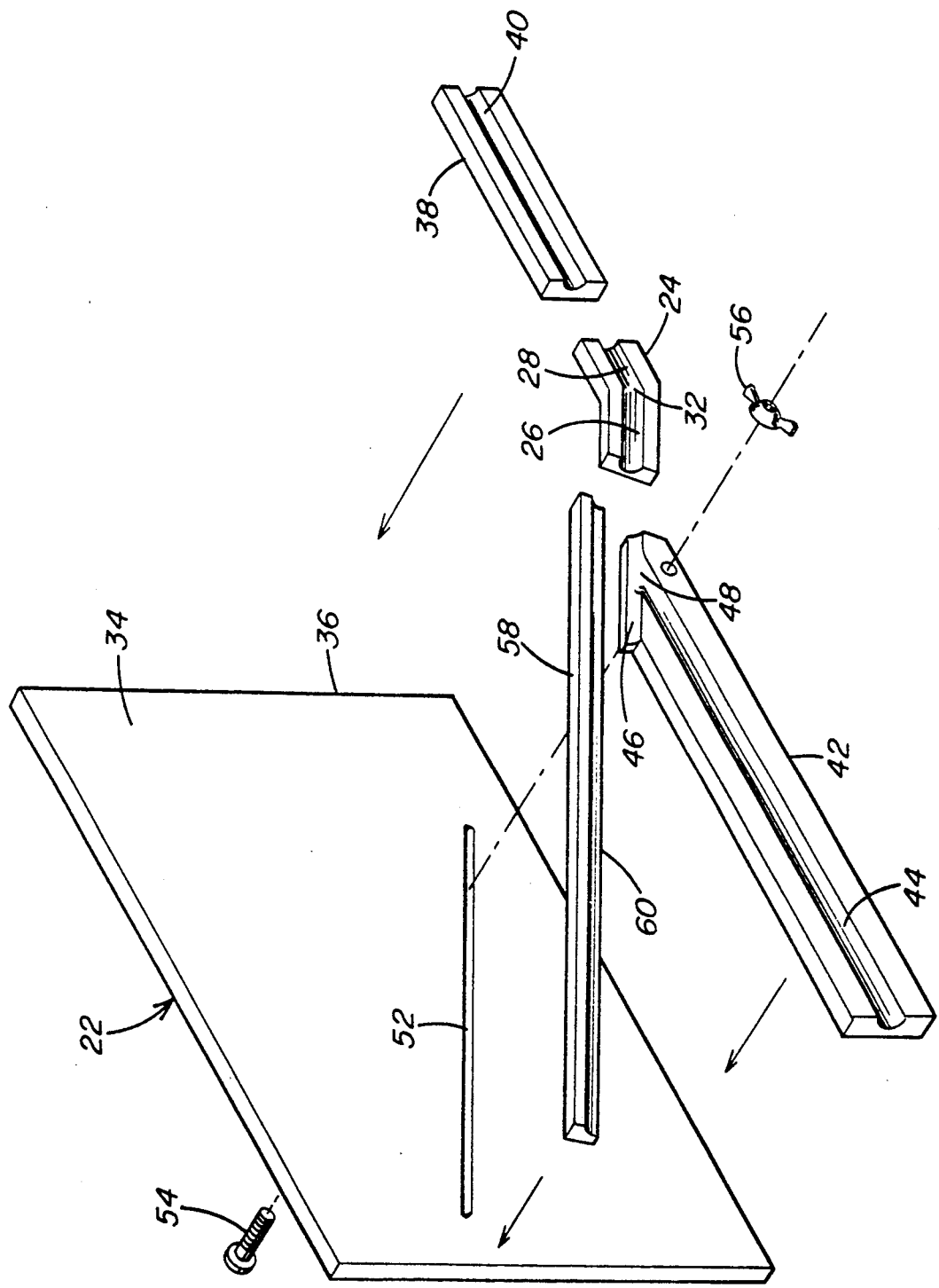

PLASTIC PIPE BENDER

BACKGROUND OF THE INVENTION

1. Field of Invention

This invention relates to the bending of small diameter, heat deformable pipe or conduit such as plastic pipe and more particularly to field bending of such pipe or conduit.

2a. Technical Considerations

There has been an increase in the use of plastic conduit in the past several years. The conduit is generally used to protect electrical wiring. Due to the nature of its use, oftentimes the pipe must include a plurality of bends along its length. Factory degree bends can be bought and coupled together, but the additional costs may be prohibitive, especially if the conduit is to be used in a concealed area such as a concrete pour. As a result, the plastic conduit generally is bent free hand. However, with this method, the bends are not accurate or consistent. In addition, the conduit diameter may be altered along the bend from round to slightly oval so that wire pulling through the conduit in an electrical application can be difficult. Also, the general appearance of the plastic conduit bent free hand is poor, especially if it is used in exposed work, and it is very difficult to make the same repeated bend as is necessary when fabricating offset bent pipe. As used herein, an offset bent conduit is a conduit whose longitudinal axis is laterally shifted such that the longitudinal axis of a first portion of the conduit is parallel to but spaced from the longitudinal axis of a second portion of the conduit. The perpendicular distance between the spaced axes is the "offset" and the bends in the conduit are the "offset bends."

2b. Patents of Interest

Curtis U.S. Pat. No. 3,776,539 et al. discloses a plastic pipe bending jig having a plurality of operatively interconnected arms and pipe receiving clamps connected to the radial extremities of the arms. The clamps are radially and angularly adjustable to a desired radius and angle of curvature of the pipe. The jig is used by adjusting the clamps to define the desired pipe configuration, heating the pipe until pliable and placing the pipe in the clamps until the pipe hardens.

Miller U.S. Pat. No. 4,156,588 et al. discloses field forming of large diameter plastic pipes. The jig includes a two-piece spreader tube and a right and left hand U-shaped guide, each adjustable in width, angle and spacing. The guides are positioned along the spreader at a desired spacing and orientation relative to the spreader. In operation, the pipe section to be bent is heated and there placed on a flat surface. The guides are then lowered over the pipe so that each guide slides over a portion of the pipe on either side of the heated section.

SUMMARY OF THE INVENTION

The present invention provides a bending jig for forming offset bends in heat softened plastic pipe. The jig includes first and second offset bending members secured to a support member. The first offset bending member includes first and second surfaces generally configured to support first and second portions of a pipe to be bent. These support surfaces intersect at a first predetermined bending angle. The second offset bending member includes third and fourth surfaces generally configured to support third and fourth portions of said pipe to be bent. These support surfaces intersect at a second predetermined bending angle. The offset bending members are spaced apart, i.e. offset relative to each other such that such that a portion of the first support surface is linearly aligned with a portion of the third support surface and a portion of the second support surface is parallel to and offset from a portion of the fourth support surface.

In one particular embodiment of the invention, the supporting surfaces of the offset members generally correspond to the outer surface of the pipe to be bent and the bending angle in each of the offset bending members is the same. In addition, the second bending member is slidably positioned on a support member such that the members can be positioned relative to each other to provide the desired offset in the pipe to be bent.

BRIEF DESCRIPTION OF THE DRAWINGS

FIG. 3 is an exploded, isometric view of the bending jig illustrated in FIG. 2.

DETAILED DESCRIPTION OF THE INVENTION

Figures 1, 2:
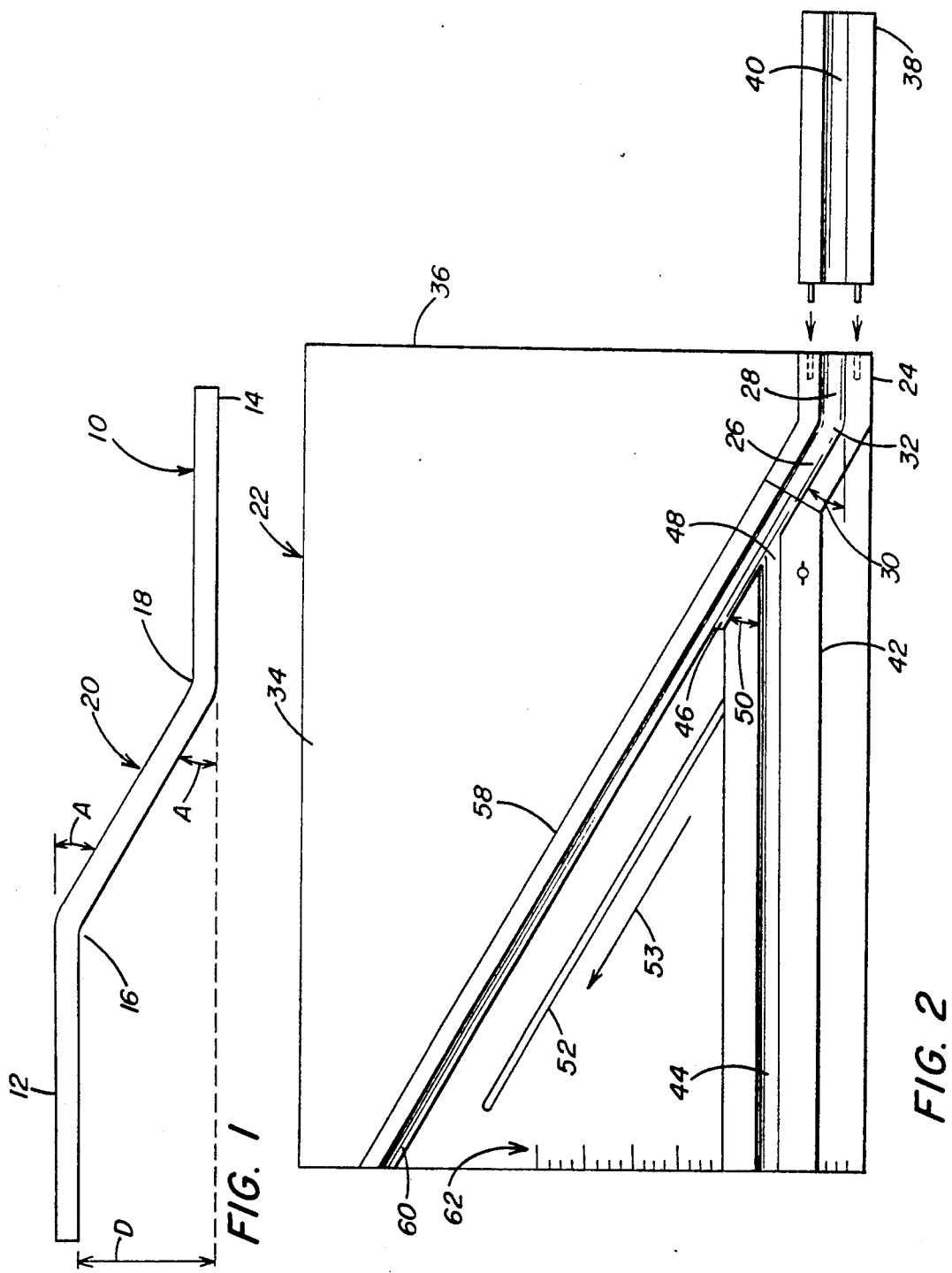
FIG. 1 is a plan view of a pipe or conduit having a typical offset bend.
FIG. 2 is a plan view of a pipe offset bending jig incorporating the novel features of the present invention.

FIG. 1 illustrates a conduit or pipe 10 having a typical offset bend configuration which, although not limiting in the present invention, can be fabricated using the teachings of the present invention. It should be understood that this configuration is illustrative and the present invention is not limited to a fabricating a pipe having this configuration.

Referring to FIG. 1, pipe 10 includes end portions 12 and 14, angularly bent portions 16 and 18 and intermediate portion 20. Portions 12 and 14 are generally parallel to each other and spaced apart an offset distance D. The angle A formed by the intersection of the intermediate portion 20 with the end portions 12 and 14 at bent portions 16 and 18, respectively, is the offset angle, and although not limiting in the present invention, is generally the same at both bent portions.

Referring to FIGS. 2 and 3, bending jig 22 includes a first offset bending member 24 having grooves 26 and 28 which intersect at a predetermined offset angle 30 at a bending area 32 secured to surface 34 of support 36. The grooves 26 and 28 have a surface configuration approximating the outer diameter of a pipe to be bent and support the pipe as will be discussed later in more detail. Although not required, the offset member 24 may be provided with a removable portion 38 to aid in the support of the pipe. Portion 38 also has a groove 40 having a surface generally corresponding to the outer diameter of the pipe to be formed.

Jig 22 also includes a second offset bending member 42 with grooves 44 and 46 whose surface generally corresponds to the outer diameter of the pipe in a manner similar to that discussed earlier with grooves 26, 28 and 40. Grooves 44 and 46 intersect at bending area 48 to form angle 50 which in the preferred embodiment of the invention, is equal to offset angle 30 so that groove 44 of second bending member 42 is parallel to but offset from groove 28 of first bending member 24 and groove 46 of second bending member 42 is aligned with groove 26 of first bending member 24. It is recommended that the angles 30 and 50 comply with the National Electric Code 346-10.

Bending members 24 and 42 are movable relative to each other so that the offset distance between the members can be adjusted to provide the desired offset in the pipe to be bent. Although not limiting in the present invention, in the preferred embodiment of the invention, second bending member 42 lies flat against surface 34 and slides along a slot 52 in the direction indicated by arrow 53, which generally parallels grooves 26 and 46. The second member 42 is secured in place along the slot 52 in any convenient manner, e.g. by bolt 54 and wing nut 56. As member 42 slides along slot 52, only the lateral offset distance between grooves 28 and 44 and the longitudinal distance between members 24 and 42 change. Groove 46 will remain linearly aligned with groove 26 and groove 44 will remain parallel to groove 28.

As an alternative to using a sliding arrangement as discussed above, one or both of the members 24 and 42 may be provided with alignment pins (not shown) which would be received in corresponding holes (not shown) in support 36. The receiving holes would be aligned so that when members 24 and 42 are positioned in the holes, groove 46 will remain linearly aligned with groove 26 and groove 44 will remain parallel to groove 28. The offset between members 24 and 42 would be adjusted merely by positioning the members at different alignment holes.

Section 58 is secured to support 36 and includes a grooved surface 60 which generally corresponds to the outer diameter of the pipe to be bent. Section 58 is oriented such that the groove 60 parallel the slot 52 and supports an intermediate portion of the pipe or permits one to by-pass bending area 48 as will be discussed later.

In operation, jig 22 is initially provided with members 24 and 42 having bending areas corresponding to the desired offset bending angle A. Member 42 is positioned along slot 52 so as to provide the required offset distance D. Although limiting in the present invention, in the embodiment illustrated in FIG. 2, a scale 62 is provided to indicate the offset distance. Heat deformable pipe 10 is heated locally at predetermined bend areas 16 and 18 until they are pliable. Oftentimes, the areas 16 and 18 are sufficiently close such that the intermediate portion 20 is also heated during this heating opeation. The pipe 10 is then placed in the jig 22 with portion 14 being positioned and supported on groove 28 of member 24 (and groove 40 if member 38 is provided), portion 12 being positioned and supported on groove 44 of member 42, heated bend areas 16 and 18 being positioned and supported at bending area 48 of member 42 and bending area 32 of member 24, respectively, and intermediate portion 20 being positioned and supported on groove 60 of section 58. As the pipe 10 cools, it will conform to the angles 30 and 50 of bending areas 32 and 48, respectively, and have the desired offset as established by scale 62.

If desired, the jig 22 can be used to form a single, accurate bend in pipe 10. More particularly, the pipe 10 can be locally heated and placed in jig 22 such that the heated portion is supported at bending area 32 of member 24, a first extending portion of the pipe is supported by portion 38 and a second extending portion is supported by section 58.

The form of the invention shown and described in this specification represents an illustrative preferred embodiment and it is understood that various changes may be made without departing from the spirit of the invention as defined in the following claimed subject matter.

I claim:

1. An apparatus for bending heat deformable pipe to a predetermined offset distance comprising:
    a support member;
    a first offset bending member secured to said support member and having first and second surfaces generally configured to support first and second portions of a pipe to be bent, said first and second support surfaces intersecting at a first predetermined bending angle;
    a second offset bending member secured to said support member and having third and fourth surfaces generally configured to support third and fourth portions of said pipe to be bent, said third and fourth support surfaces intersecting at a second predetermined bending angle; and
    means to adjustably position at least one of said first and second offset bending members at a plurality of predetermined positions on said support member, each of said predetermined positions corresponding to a predetermined offset distance such that at each of said predetermined positions, a portion of said first support surface is linearly aligned with a portion of said third support surface and a portion of said second support surface is parallel to and at a predetermined offset distance from a portion of said fourth support surface.

2. The apparatus as in claim 1 wherein said first predetermined angle equals said second predetermined angle.

3. The apparatus as in claim 1 wherein said support surfaces are grooved surfaces generally complimenting the outer surface of said pipe to be bent.

4. The apparatus as in claim 1 further including a scale to accurately indicate said predetermined offset distances.

5. The apparatus as in claim 1 wherein said adjustable positioning means includes at least one pin extending from at least one of said offset bending members and a plurality of alignment holes positioned in said support member and each corresponding to one of said predetermined distances such that when said pin of said at least one offset bending member is received within a corresponding hole, said portion of said first support surface is linearly aligned with said portion of said third support surface and said portion of said second support surface is parallel to and at one of said predetermined offset distances from said portion of said fourth support surface.

6. The apparatus as in claim 1 wherein said adjustable positioning means includes means to permit said second offset bending member to slide on said support.

7. The apparatus as in claim 1 wherein said adjustable positioning means includes means to slidably secure said second offset bending member along a slot in said support member such that said portion of said first support surface remains linearly aligned with said portion of said third support surface and said portion of said second support surface remains parallel to and offset from said portion of said fourth support surface.

8. The apparatus as in claim 7 wherein said support surfaces are grooved surfaces generally complimenting the outer surface of said pipe to be bent.

9. The apparatus as in claim 8 wherein said first predetermined angle equals said second predetermined angle.

10. The apparatus as in claim 9 further including a scale to indicate said predetermined offset distance.

11. The apparatus as in claim 1 further including an intermediate support secured to said support member and extending between said first and second offset bending members such that a support surface of said intermediate support is generally aligned with said aligned portions of said first and third support surfaces of said first and second bending members, respectively.

12. The apparatus as in claim 9 further including an intermediate support secured to said support member and extending between said first and second offset bending members such that a support surface of said intermediate support is generally aligned with said aligned portions of said first and third support surfaces of said first and second bending members, respectively.

13. An apparatus for bending heat deformable pipe comprising:
a support member;
a first offset bending member secured to said support member and having first and second linearly extending surfaces intersecting at a first predetermined bending angle, wherein said first and second extending surfaces support corresponding portions of a pipe to be bent on either side of said first angle;
a second offset bending member secured to said support member and having third and fourth linearly extending surfaces intersecting at a second predetermined bending angle, wherein said third and fourth extending surfaces support corresponding portions of said pipe to be bent on either side of said second angle; and
means to adjustably position at least one of said first and second offset bending members at a plurality of predetermined positions on said support member, each of said predetermined positions corresponding to a desired offset distance such that at each of said predetermined positions, a portion of said first surface is linearly aligned with a portion of said third surface and a portion of said second surface is parallel to and at a desired offset distance from a portion of said fourth surface.

* * * * *